(12) United States Patent
Meunier

(10) Patent No.: US 7,860,641 B2
(45) Date of Patent: Dec. 28, 2010

(54) SYSTEM FOR SELECTIVE DISPLAY OF AIRPORT TRAFFIC INFORMATION

(75) Inventor: Hugues Meunier, Frouzins (FR)

(73) Assignee: Thales (FR)

( * ) Notice: Subject to any disclaimer, the term of this patent is extended or adjusted under 35 U.S.C. 154(b) by 482 days.

(21) Appl. No.: 11/962,065

(22) Filed: Dec. 20, 2007

(65) Prior Publication Data

US 2010/0042312 A1   Feb. 18, 2010

(30) Foreign Application Priority Data

Dec. 20, 2006   (FR)   .................................. 06 11088

(51) Int. Cl.
G06F 19/00   (2006.01)

(52) U.S. Cl. ........................ 701/120; 701/118; 701/211; 340/945; 342/29

(58) Field of Classification Search .................... 701/3, 701/118, 119, 120, 207, 208, 211, 213; 340/945, 340/947; 342/29, 33, 36
See application file for complete search history.

(56) References Cited

U.S. PATENT DOCUMENTS 5,374,932 A   12/1994   Wyschogrod et al.
6,278,965 B1 *   8/2001   Glass et al. .................... 703/22
6,282,488 B1 *   8/2001   Castor et al. ................. 701/120
7,109,889 B2   9/2006   He
2005/0190079 A1   9/2005   He

FOREIGN PATENT DOCUMENTS

FR   2837591 A1   3/2002
WO   03 071228 A2   8/2003

OTHER PUBLICATIONS

Yeh, Michelle, "Human Factors Considerations in the Design and Evaluation of Moving Map Display of Ownship on the Airport Surface", DOT/FAA/AR-O4/39, Sep. 2004, U.S. Department of Transportation, Research and Special Programs Administration, John A. Volpe National Transportation Systems Center Cambridge, MA 02142.

* cited by examiner

Primary Examiner—Gertrude Arthur Jeanglaud
(74) Attorney, Agent, or Firm—Lowe Hauptman Ham & Berner, LLP (57) ABSTRACT

This system for displaying, on the flight deck of an aircraft travelling on the surface of an airport, an airport map mentioning the surface traffic, for the purpose of a taxiing aid and protection of the ground movements of the aircraft, shows on the airport map only the traffic occupying the airport thoroughfares close to the aircraft, this closeness being defined by the existence of a joining path comprising a number of thoroughfare sections that is less than an arbitrary limit of the order of 1 or 2.

10 Claims, 9 Drawing Sheets

SYSTEM FOR SELECTIVE DISPLAY OF AIRPORT TRAFFIC INFORMATION

RELATED APPLICATIONS

The present application is based on, and claims priority from, French Application Number 06 11088, filed Dec. 20, 2006, the disclosure of which is hereby incorporated by reference herein in its entirety.

FIELD OF THE INVENTION

The present invention relates to the display, on the flight deck of an aircraft travelling on the surface of an airport, of an airport map mentioning the surface traffic, for the purpose of a taxiing aid and a protection of the ground movements of the aircraft.

BACKGROUND OF THE INVENTION

The complexity of the pattern of runways and thoroughfares of certain airports and their increasingly heavy traffic are posing more and more problems of orientation and of security for an aircraft moving on their thoroughfares in poor visibility conditions at night or in bad weather. To remedy this, it has been proposed to display on a screen of an aircraft flight deck a map of the thoroughfares of the airport in which it is moving, drawn from a cartographic database on board the aircraft or accessible to the aircraft via a data transmission link, with mention of the current position of the aircraft originating from an onboard location system such as a satellite positioning receiver and/or an inertial unit, and the mention of current positions and registration numbers of the mobiles moving on the surface or close to the surface of the airport communicated to the aircraft by radio link, by means of a system that is cooperative, such as ADS-B ("Automatic Dependence Surveillance-Broadcast") or that is centralized, such as TIS-B ("Traffic Information Service-Broadcast"). A description of various industrial prototypes of airport map flight deck display systems currently proposed appears appended to the study by Michelle YEH entitled "Human Factors Considerations in the Design and Evaluation of Moving Map Display of Ownship on the Airport Surface" DOT/FAA/AR-O4/39, published in September 2004, by U.S. Department of Transportation, Research and Special Programs Administration John A Volpe National Transportation Systems Center Cambridge, Mass. 02142.

These airport traffic map displays with transfers of the current positions of the aircraft and of the surrounding traffic poses the problem of legibility. To respond to this, it has been proposed, for example in French patent FR. 2.837.591 or in American patent U.S. Pat. No. 7,109,889, to provide the display system with a possibility of adjusting the scale and level of detail of the map. However, it remains that, in an airport zone with heavy traffic, a large number of mobiles and in particular all the aircraft having their on-board instruments in operation, whether they are parked or moving, communicate their positions and registration numbers that are transferred to the traffic map displayed on the flight deck, making it hard to read.

SUMMARY OF THE INVENTION

An object of the present invention is to remedy this disadvantage by limiting the transfer of traffic to an airport traffic map displayed on a flight deck to the elements most pertinent to a taxiing aid and a protection of the ground movements of the aircraft that is in possession of the same.

The present invention is directed to a system for selective transfer of traffic information onto an airport traffic map displayed on the flight deck of an aircraft comprising:
  means for registering the current position of the aircraft,
  at least one airport cartographical database listing, by section, the thoroughfares of an airport and storing, for each section, specific geographic position and connectivity data,
  means for generating an airport traffic map compatible with the current position of the aircraft, based on geographic position data extracted from the cartographic database,
  means for identifying the thoroughfare section occupied by the aircraft,
  means for selecting, for the purpose of the traffic display, thoroughfare sections from the displayed traffic map, separated from a thoroughfare section used by the path of the aircraft by intermediate thoroughfare sections numbering less than an arbitrary limit,
  means for registering the location of traffic in the vicinity of the current position of the aircraft,
  means for identifying thoroughfare sections used by the traffic, and
  means for displaying the traffic of the selected thoroughfare sections.

Advantageously, a thoroughfare section is delimited by an intersection or a stopping point that can be passed subject to the authorization of an authority controlling airport traffic.

Advantageously, the means for registering the location of the traffic consider only the traffic in a closing direction relative to the aircraft.

Advantageously, the selection means select thoroughfare sections from the displayed traffic map separated from the thoroughfare section occupied by the aircraft by intermediate thoroughfare sections numbering less than an arbitrary limit.

Advantageously, the selection means select the thoroughfare section occupied by the aircraft and the thoroughfare sections that cross it.

Advantageously, the selection means select the thoroughfare section occupied by the aircraft and the thoroughfare sections that cross it in front of the aircraft.

Advantageously, the selection means select the thoroughfare sections that the aircraft will use, over a distance of two intersections, and the thoroughfare sections crossing these used sections.

Advantageously, the selection means select the thoroughfare sections crossing the thoroughfare sections that the aircraft will use, over a protection distance extending in front of the aircraft, corresponding to a minimum threshold increased by a value that is a function of the current speed of the aircraft.

Advantageously, the means for registering the location of the traffic consider only:
  the traffic in front of the aircraft, using the same thoroughfare section in the same direction or in the opposite direction,
  the traffic converging on the aircraft using the thoroughfare sections directly connected to that used by the aircraft, and
  parallel traffic in the same direction as the movement of the aircraft, over sections of optional thoroughfare, that can be used by the aircraft after travelling the thoroughfare section on which it stands.

Advantageously, the means for registering the location of the traffic also consider the traffic on the thoroughfare sections connected indirectly to that used by the aircraft, when they converge on the aircraft or move in the same direction as the aircraft while these thoroughfare sections are optional thoroughfare sections that can be used by the aircraft.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF PREFERRED EMBODIMENTS

Figure 1:
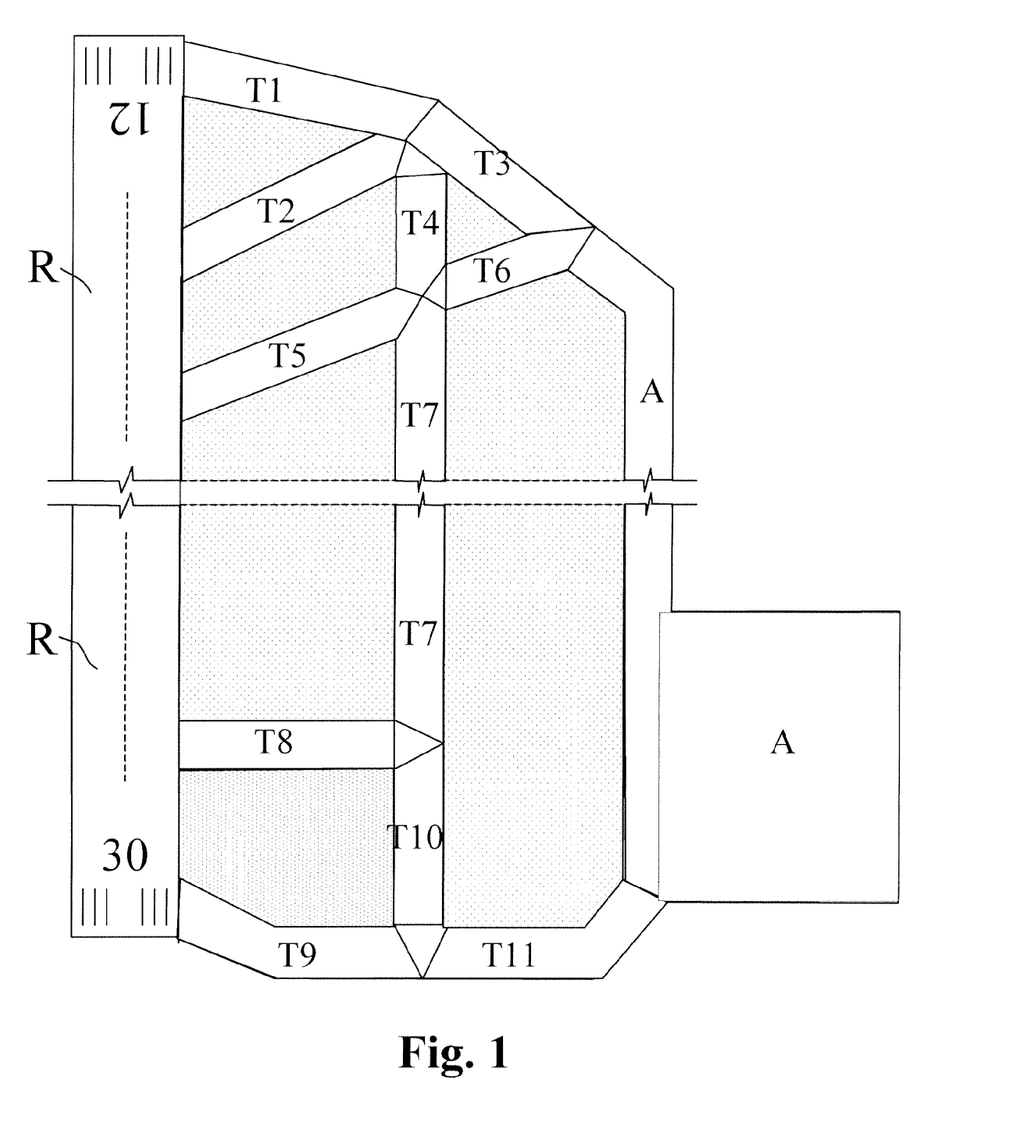
FIG. 1 represents an example of the configuration of the thoroughfares of an airport comprising a landing runway connected to a parking area by a grid of taxiways.

FIG. 1 shows an airport configuration with a landing and take-off runway R and a parking area A for the aircraft. The runway R is duplicated, on the parking area A side, by a parallel taxiway divided, for its identification, into three successive sections T4, T7 and T10. It is connected by end taxiways, divided, for their identification, into two successive sections T1, T3 and T9, T11 to the ends of the parallel taxiway T4, T7, T10 then, beyond that, to the parking area A. It is also connected to the parallel taxiway T4, T7, T10 by intermediate clearing taxiways T2, T5, T8, two of which culminate in an end taxiway T1, T3, one of them T2 directly, the other T5 by means of another taxiway T6 placed in its extension.

The division of the taxiways into sections corresponds to the intersections or, as for the taxiway section T11, to mandatory stopping points, "stop bars", that may be passed only with the authorization of an authority controlling the airport traffic.

Figure 2:
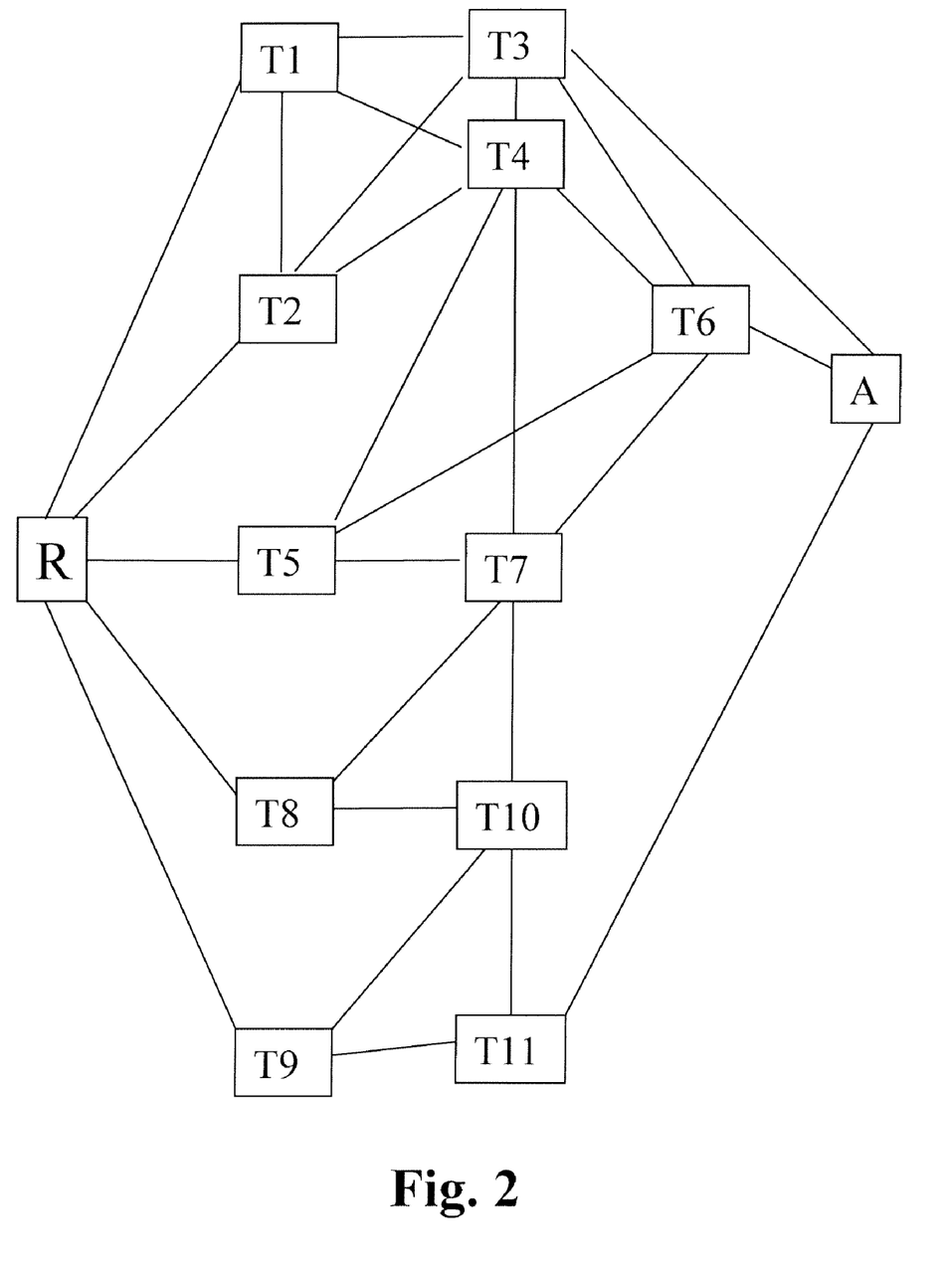
FIG. 2 is a connectivity diagram corresponding to the grid formed by the different thoroughfares of the airport represented in FIG. 1, and FIGS. 3 to 9 represent an example of an airport traffic display displayed by a system for selective transfer of information according to the invention, in a scenario corresponding, for the aircraft, to a preparation for take-off at the beginning of a runway occupied by traffic travelling in the opposite direction, and for different selection criteria and programmings.

This topology with its grid is represented in FIG. 2 in the form of a chart in which the thoroughfare sections are identified by medallions and their intersections by connections between medallions. It is stored in an airport cartographic database listing all the thoroughfare sections (runway, taxiways and parking area) of various airports and their grids by means of geographic location and connectivity data.

The geographic data identifying a thoroughfare section are, for example, its width and the coordinates of the ends of its centre-line or its width and the coordinates of the origin of a vector supported by its centre-line and the length and orientation of this vector.

The connectivity data consist, for example, in the enumeration for each thoroughfare section, of its intersections with the other thoroughfare sections that are illustrated in FIG. 2 by the connections between the medallions identifying the thoroughfare sections.

An item of aircraft location equipment makes it possible to determine the airport concerned, when the aircraft moves to the approach or to an airport surface. Another item of onboard equipment, the ADS-B and/or the TIS-B, supplies on-board information, positions and speed vectors, on the surrounding traffic.

The location information is used by an on-board cartographic display system for selecting from an airport cartographic database the geographic position data relating to the thoroughfare sections of the frequented airport, in order to generate a scrolling map mentioning the position of the aircraft relative to the thoroughfares of this airport (runway, taxiways, parking area).

The information on the surrounding traffic, instead of being directly transferred to the scrolling airport map generated by the on-board cartographic display system, is subjected to a preliminary sort by a system for selective transfer of traffic information which:

positions each traffic element indicated relative to the thoroughfare sections (runway, taxiway, parking area) listed in the airport cartographic database, selects from those listed the thoroughfare sections considered to be sensitive so as to retain only their traffic, this selection taking effect on a criterion of proximity relative to the thoroughfare section occupied by the aircraft or to the airport path that the aircraft must travel, based on the existence, for the retained sections, of a joining path using a number of thoroughfare sections less than an arbitrary limit, this proximity criterion advantageously being supplemented by a criterion of closing relative to the traffic present on the thoroughfare sections considered to be sensitive relative to the thoroughfare section occupied by the aircraft, and allows the display of only traffic matching the two criteria of proximity and relative closing.

The proximity criterion is applied simply by a logical analysis of the chart of FIG. 2. When it is applied relative to the thoroughfare section occupied by the aircraft, its application consists in retaining as sensitive all the thoroughfare sections whose medallions are connected to that of the thoroughfare section occupied by the aircraft by a number of connections less than the accepted arbitrary limit. When it is applied relative to the airport path of the aircraft, its application consists in retaining as sensitive all the thoroughfare sections whose medallions are connected to any one of the thoroughfare sections used by the path of the aircraft by a number of connections less than the accepted arbitrary limit.

The closing criterion is also simply applied by a more or less detailed analysis of the directions of variation of the distances of the traffic elements retained after applying the proximity criterion relative to the thoroughfare section occupied by the aircraft or relative to the current position of the aircraft. This analysis may consist only in registering the position and direction of movement of the aircraft along the thoroughfare section that it occupies, in order to eliminate the traffic appearing in the rear lateral sectors and behind the aircraft. It may also consist in estimating the traffic element curvilinear distances measured over the various possible joining paths by thoroughfare sections considered to be sensitive and in considering only the traffic elements that are present on the thoroughfare sections considered to be sensitive of which at least one of the curvilinear distances is diminishing.

FIGS. 3 to 9 correspond to different displays of one and the same traffic on an airport map represented in FIG. 1, as a function of the programming of the proximity criterion and of whether or not the additional closing criterion is applied. In the scenario in question, the aircraft 1 having the display of the airport map is in the take-off phase on the runway R. The traffic consists of various aircraft 2 to 13 parked in the parking area A or moving on the taxiways T1 to T10 and the runway R. In these figures, the aircraft 2 to 13 included in the airport traffic are represented, for better clarity, by simple silhouettes whereas, in reality, their silhouettes are accompanied by their registration numbers in order to allow the aircraft 1 having the display to enter into communication with any one of the aircraft included in the traffic. In all these figures, the silhouette of the aircraft 1 having the display appears cross-hatched while the silhouettes of the aircraft belonging to the traffic appear in black or white depending on whether or not they are displayed on the airport map.

Figure 3:
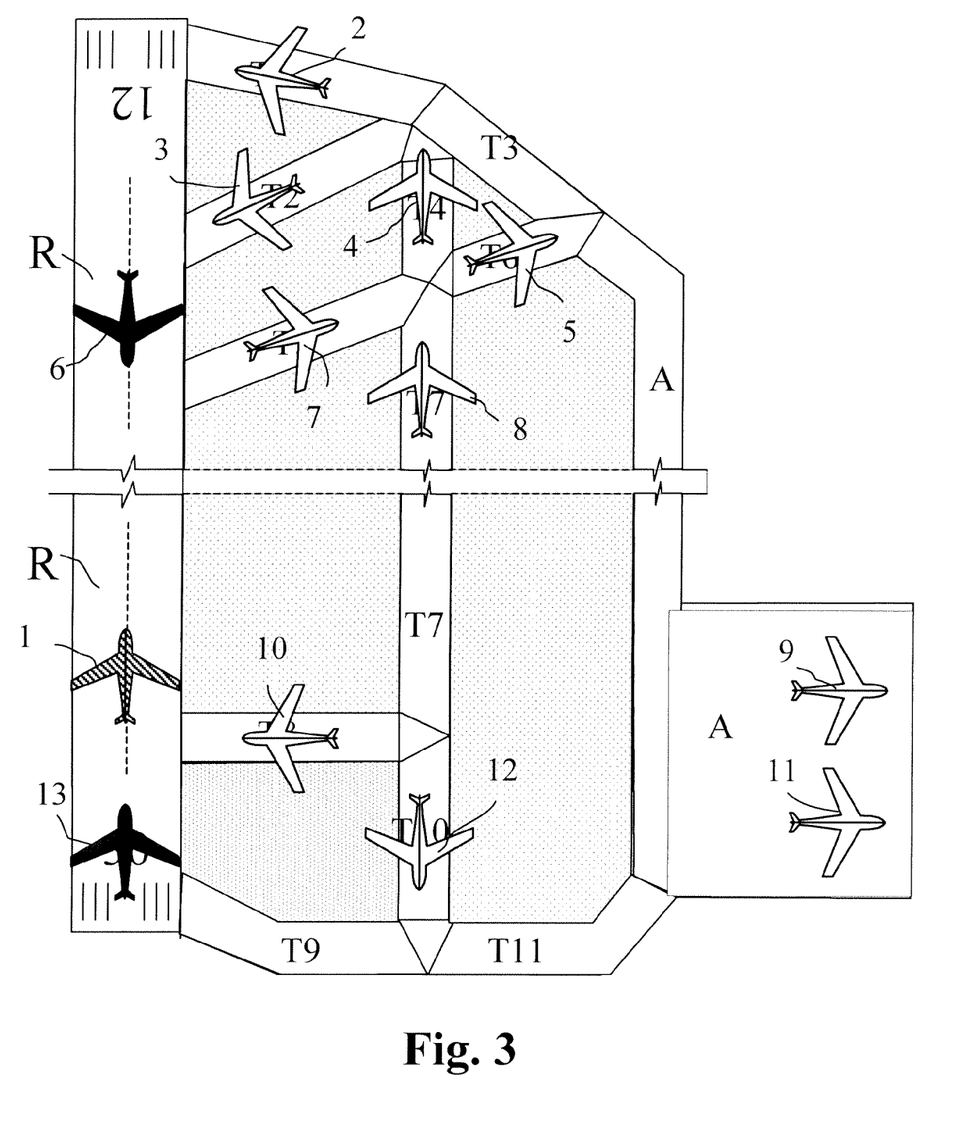

The display of FIG. 3 corresponds to the airport map seen by the aircraft 1 when the system for selective transfer of information carries out its traffic sort on a single proximity criterion programmed with a zero limit number limiting the thoroughfare sections considered to be sensitive to only the thoroughfare section (the runway R) occupied by the aircraft 1. The aircraft 1 sees displayed on its airport map only the aircraft 6 coming towards it in the opposite direction on the runway R and the aircraft 13 placed behind it at the entrance to the runway R.

Figure 4:
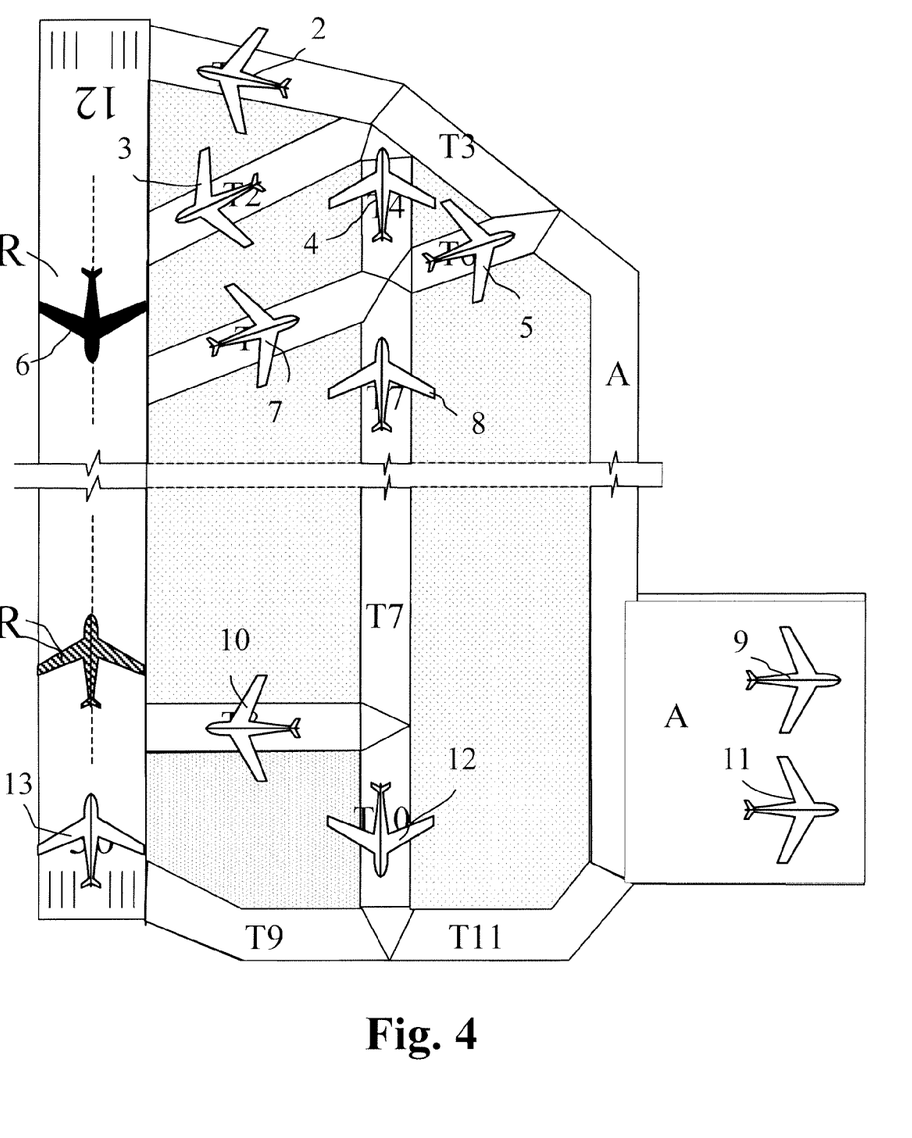

The display of FIG. 4 corresponds to the airport map seen by the aircraft 1 when the system for selective transfer of information carries out its traffic sort with the same proximity criterion programming as in the case of FIG. 3 (limit number zero), supplemented by a relative closing criterion referenced relative to the current position of the aircraft 1. The aircraft 13 has disappeared from the airport map displayed in the aircraft 1 since the aircraft 1 is moving away from it.

Figure 5:
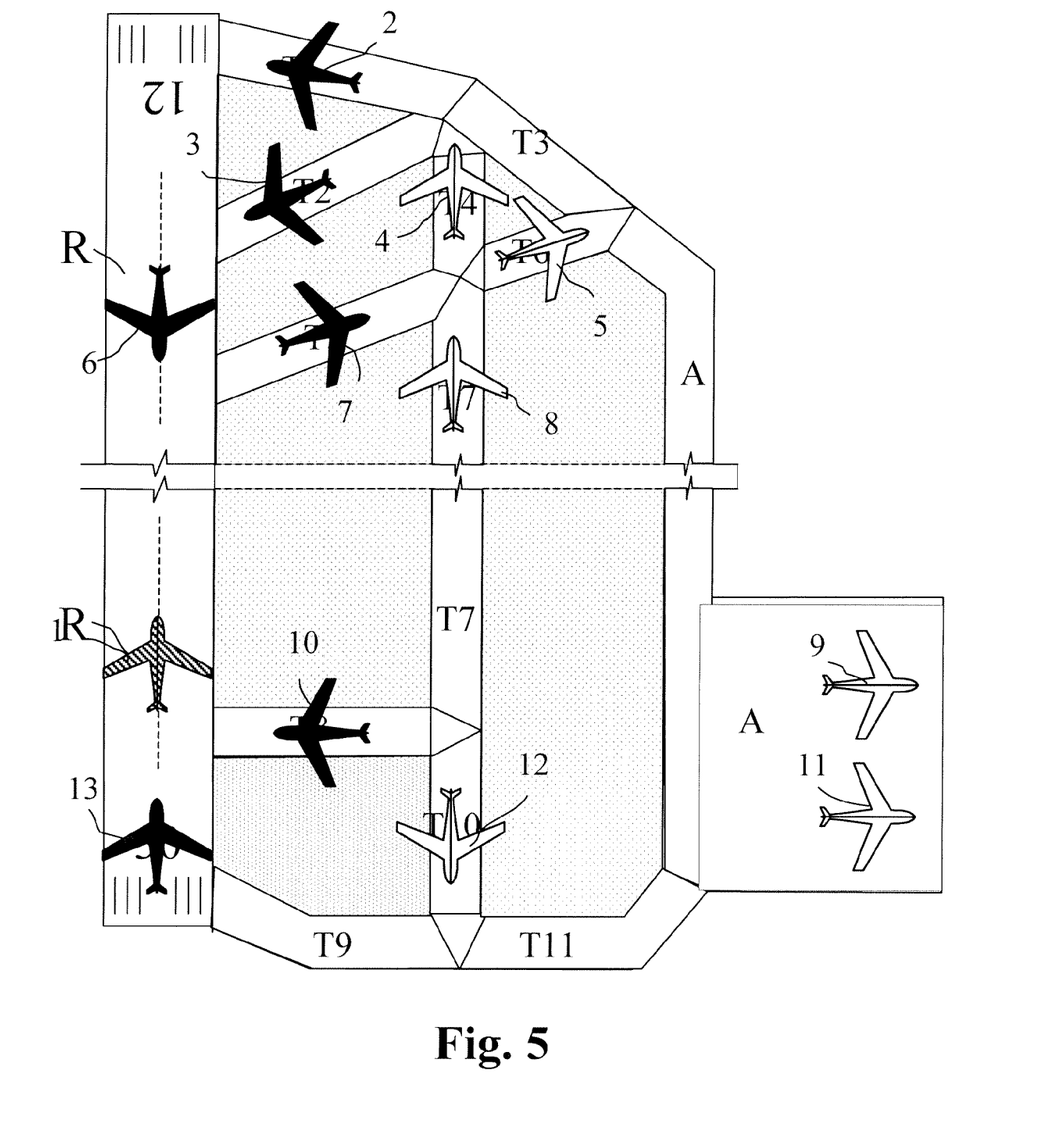

The display of FIG. 5 corresponds to the airport map seen by the aircraft 1 when the system for selective transfer of information carries out its traffic sort on a single proximity criterion programmed with a limit number equal to one, limiting the thoroughfare sections considered to be sensitive to the thoroughfare section (the runway R) occupied by the aircraft 1 and to the thoroughfare sections emerging directly thereon (the taxiways T1, T2, T5, T8 and T9). The aircraft 1 sees displayed on its airport map the aircraft 6 and 13 occupying the runway R and the aircraft 2, 3, 7 and 10 occupying the taxiways T1, T2, T5 and T8 emerging directly onto the runway R.

Figure 6:
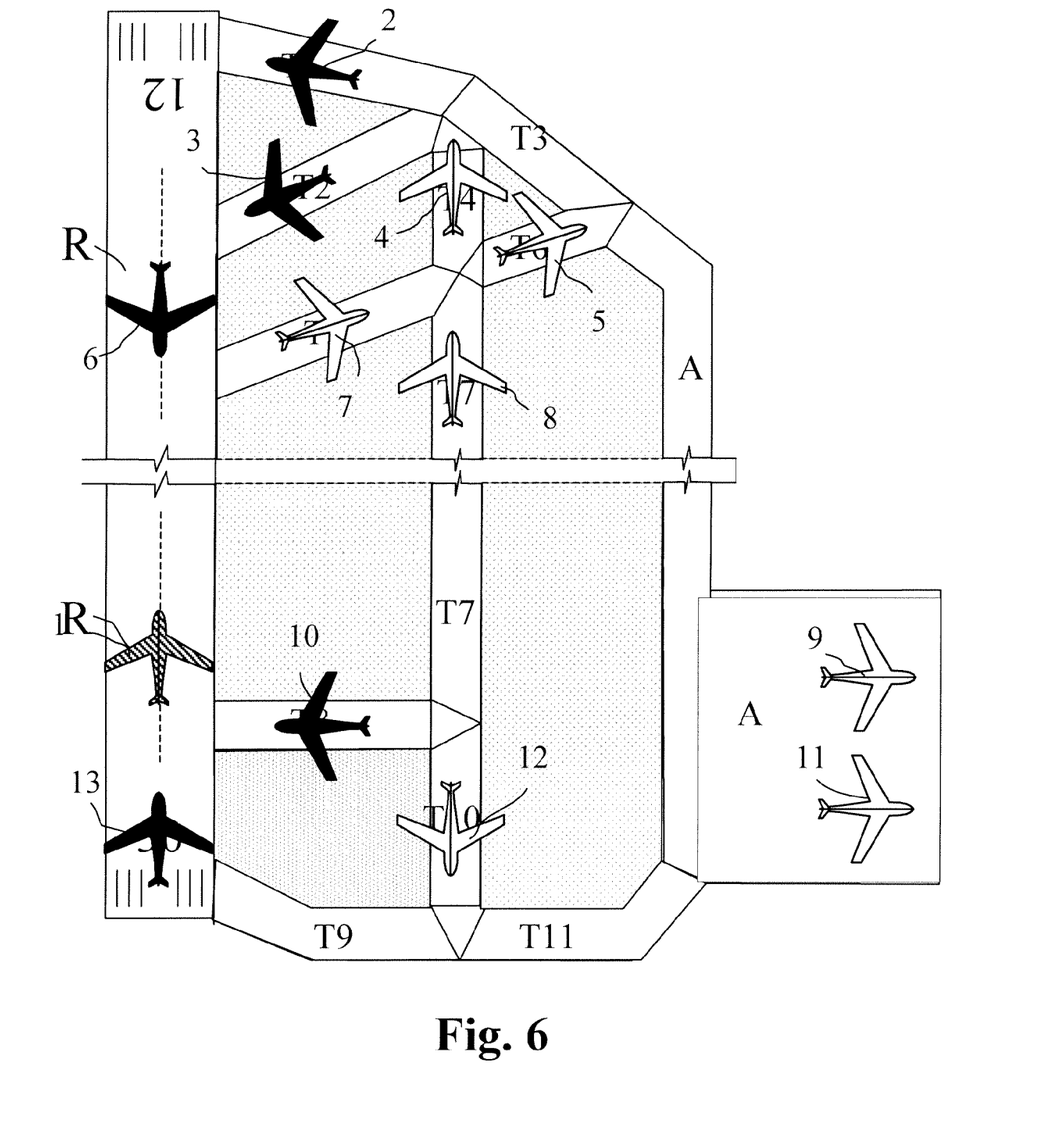

The display of FIG. 6 corresponds to the airport map seen by the aircraft 1 when the system for selective transfer of information carries out its traffic sort with the same proximity criterion programming as in the case of FIG. 5 (limit number equal to one), supplemented by a relative closing criterion referenced relative to the thoroughfare section occupied by the aircraft 1. Relative to the airport map of FIG. 5, the aircraft 7 moving away on the taxiway T10 has been removed from the display.

Figure 7:
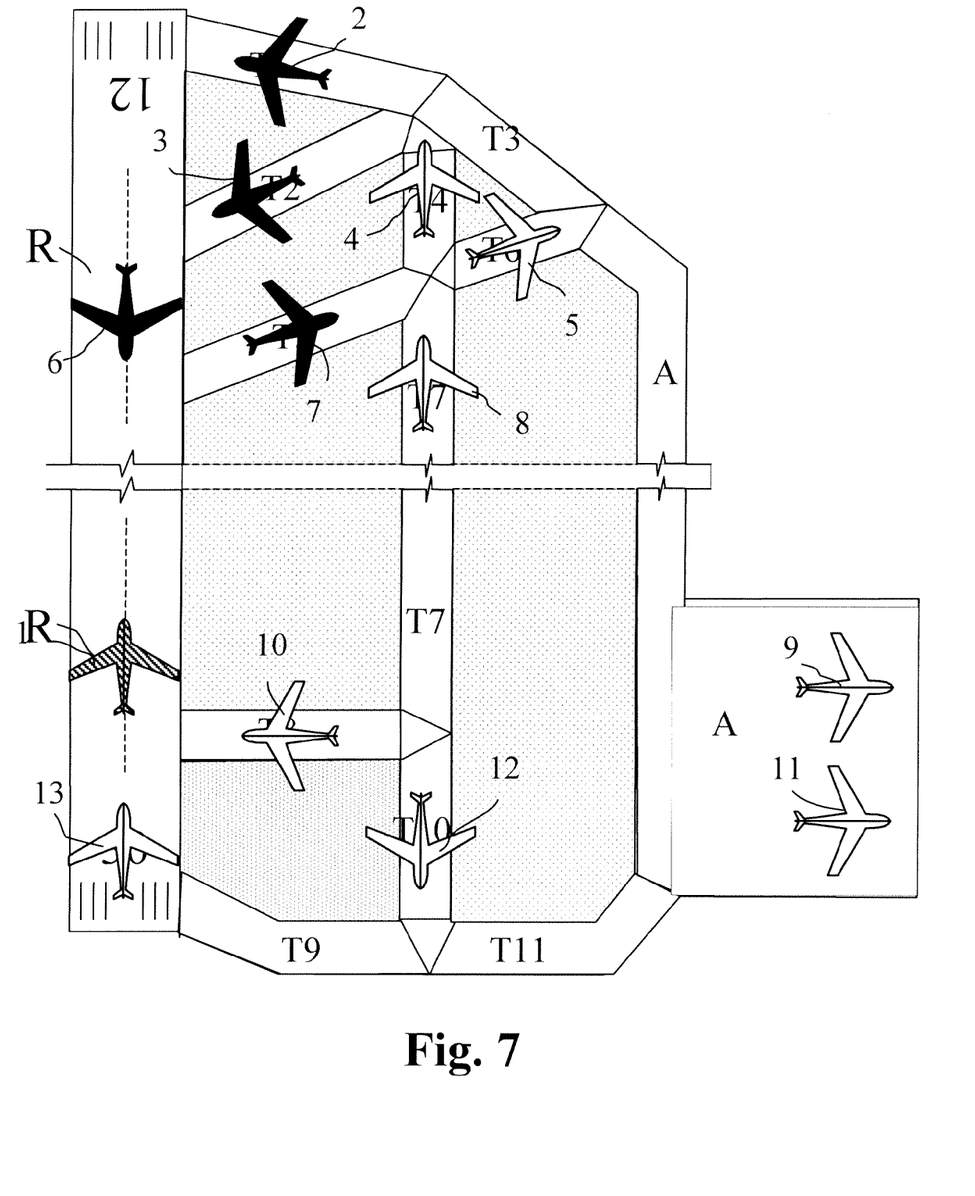

The display of FIG. 7 corresponds to the airport map seen by the aircraft 1 when the system for selective transfer of information carries out its traffic sort with the same proximity criterion programming as in the case of FIG. 5 (limit number equal to one), supplemented by a relative closing criterion referenced relative to the current position of the aircraft 1. Relative to the airport map of FIG. 5, the aircraft 10 approaching the runway R via taxiway T8 and the aircraft 13 placed behind the aircraft 1, at the entrance to the runway R, have been removed from the display because the aircraft 1 is moving away from them.

Figure 8:
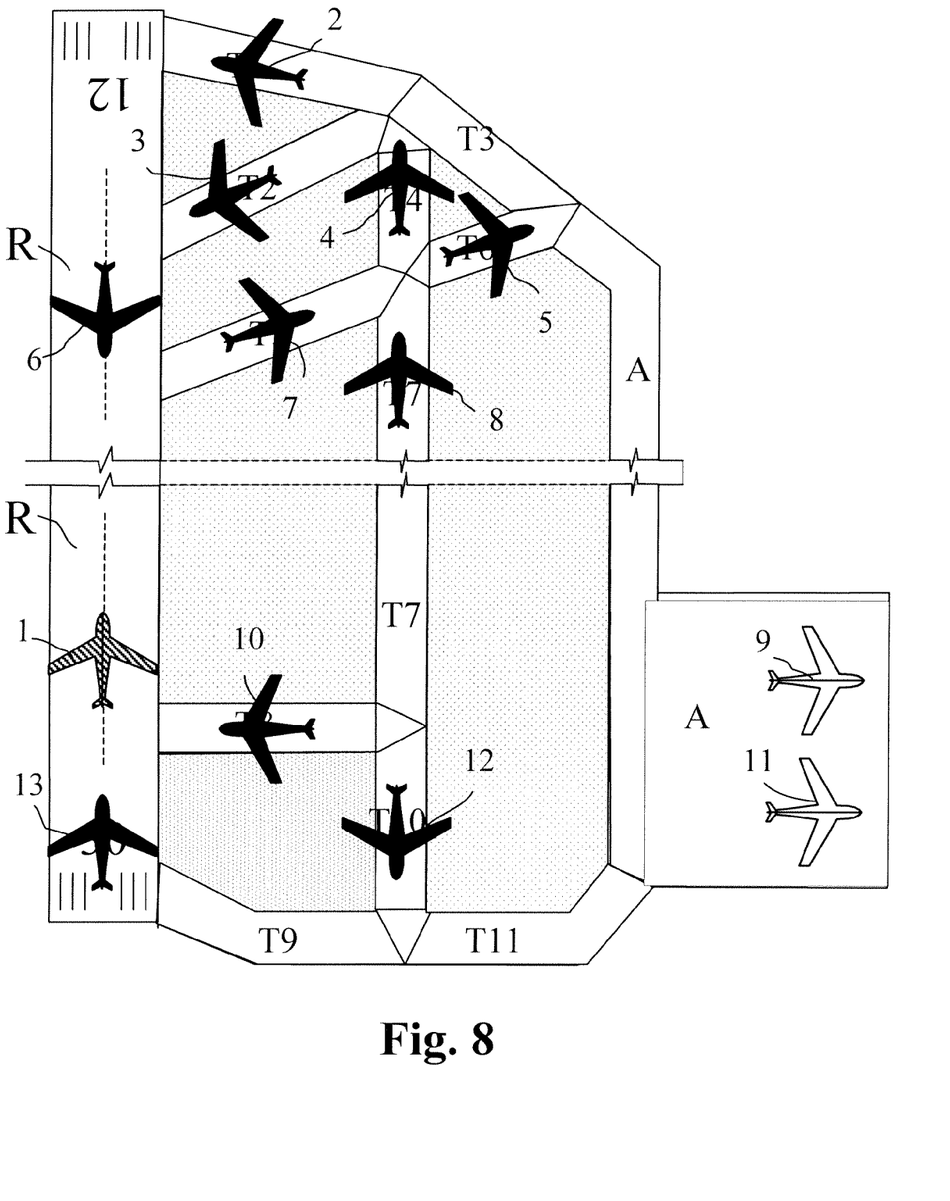

The display of FIG. 8 corresponds to the airport map seen by the aircraft 1 when the system for selective transfer of information carries out its traffic sort on a single proximity criterion programmed with a limit number equal to two, limiting the thoroughfare sections considered to be sensitive to the thoroughfare section (the runway R) occupied by the aircraft 1, to the thoroughfare sections directly connected to the runway R (the taxiways T1, T2, T5, T8 and T9) and to the thoroughfare sections connected to the runway R by at most one intermediate thoroughfare section (the parallel taxiway T7 and the taxiways T3, T6, T11). The aircraft 1 sees displayed on its airport map the aircraft 6 and 13 occupying the runway R and the aircraft 2, 3, 7 and 10 occupying the taxiways T1, T2, T5 and T8 emerging directly onto the runway R, the aircraft 4, 8, 12 travelling on the parallel taxiway T7 and the aircraft travelling on the taxiway T6.

Figure 9:
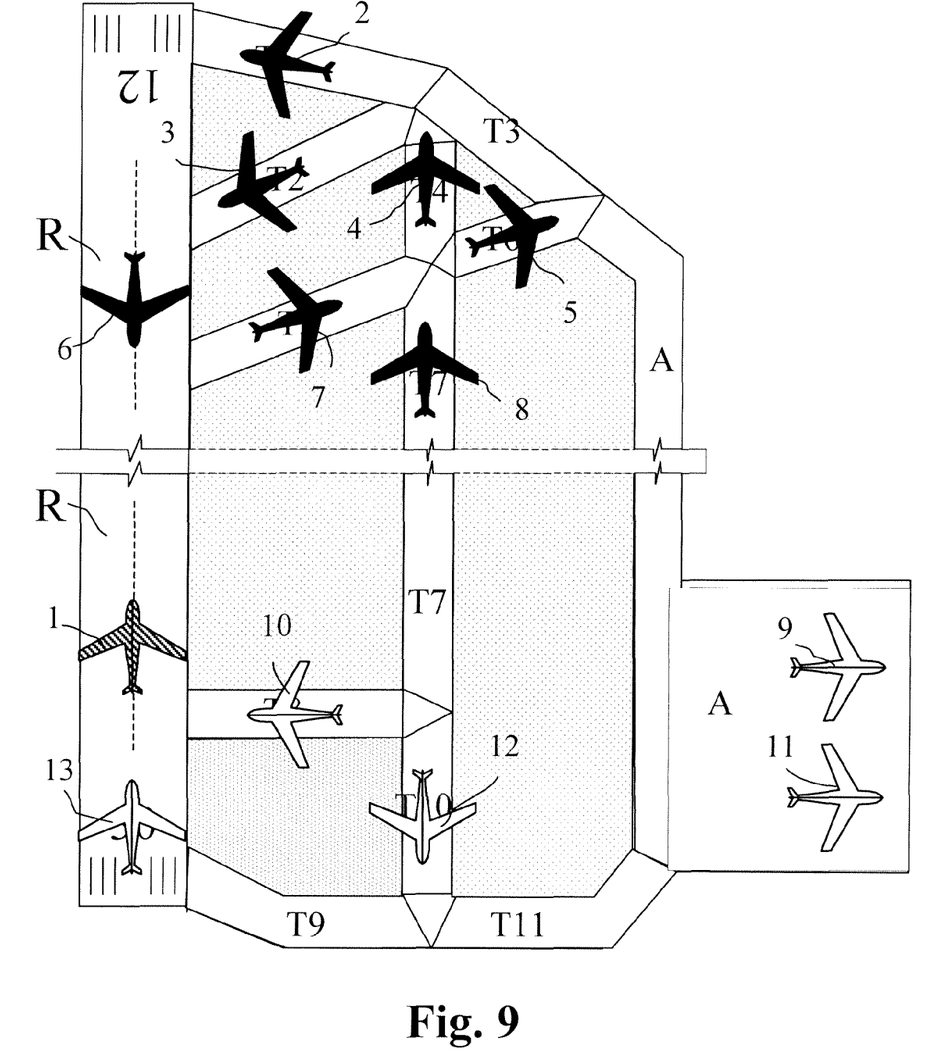

The display of FIG. 9 corresponds to the airport map seen by the aircraft 1 when the system for selective transfer of information carries out its traffic sort with the same proximity criterion programming as in the case of FIG. 8 (limit number equal to two), supplemented by a relative closing criterion referenced relative to the current position of the aircraft 1. Relative to the airport map of FIG. 7, the aircraft 10 approaching the runway R via the taxiway T8, the aircraft 13 placed behind the aircraft 1, at the entrance to the runway R and the aircraft 12 travelling on the parallel taxiway T7 have been removed from the display because the aircraft 1 is moving away from them.

Thanks to the system for selective transfer of information that has just been described, it is possible to remove the traffic elements that are at a distance from its maneuvering area, such as aircraft parking in the parking areas and aircraft taxiing on the taxiways at a distance from the runway when it is in the take-off phase, from an airport map displayed onboard an aircraft in order to help the crew when travelling on the ground.

In the landing phase, the criterion of proximity relative to the airport path that the aircraft must travel also makes it possible to remove from the airport map the traffic parked in the parking areas or travelling on runways or taxiways at a distance from its path.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A system of selectively transferring traffic information onto an airport traffic map displayed on the flight deck of an aircraft, said system comprising:
   means for registering a current position of the aircraft,
   at least one airport cartographical database listing, by section, thoroughfares of an airport and storing, for each section, specific geographic position and connectivity data,
   means for generating an airport traffic map compatible with the current position of the aircraft, based on the geographic position data extracted from the cartographic database,
   means for identifying the thoroughfare section occupied by the aircraft, means for selecting, for the purpose of the traffic display, thoroughfare sections from the displayed airport traffic map, said thoroughfare sections being separated from a thoroughfare section used by a path of the aircraft by intermediate thoroughfare sections, wherein the number of said thoroughfare sections is less than an arbitrary limit, means for registering a location of the traffic in the vicinity of the current position of the aircraft, means for identifying thoroughfare sections used by the traffic, and means for displaying the traffic of the selected thoroughfare sections.

2. The system according to claim 1, wherein a thoroughfare section is delimited by an intersection or a stopping point that can be passed subject to the authorization of an authority controlling airport traffic.

3. The system according to claim 1, wherein the means for registering the location of the traffic consider only the traffic in a closing direction relative to the aircraft.

4. The system according to claim 1, wherein said means for selecting select thoroughfare sections from the displayed airport traffic map separated from the thoroughfare section occupied by the aircraft by intermediate thoroughfare sections numbering less than an arbitrary limit.

5. The system according to claim 1, wherein said means for selecting select the thoroughfare section occupied by the aircraft and the thoroughfare sections that cross said thoroughfare section occupied by the aircraft.

6. The system according to claim 1, wherein said means for selecting select the thoroughfare section occupied by the aircraft and the thoroughfare sections that cross said thoroughfare section occupied by the aircraft in front of the aircraft.

7. The system according to claim 1, wherein said means for selecting select the thoroughfare sections that the aircraft will use, over a distance of two intersections, and the thoroughfare sections crossing these used thoroughfare sections.

8. The system according to claim 1, wherein said means for selecting select the thoroughfare sections crossing the thoroughfare sections that the aircraft will use, over a protection distance extending in front of the aircraft, corresponding to a minimum threshold increased by a value that is a function of the current speed of the aircraft.

9. A system of selectively transferring of traffic information onto an airport traffic map displayed on the flight deck of an aircraft, said system comprising:

means for registering a current position of the aircraft, at least one airport cartographical database listing, by section, thoroughfares of an airport and storing, for each section, specific geographic position and connectivity data, means for generating an airport traffic map compatible with the current position of the aircraft, based on the geographic position data extracted from the cartographic database, means for identifying the thoroughfare section occupied by the aircraft, means for selecting, for the purpose of the traffic display, thoroughfare sections from the displayed airport traffic map, separated from a thoroughfare section used by the path of the aircraft by intermediate thoroughfare sections numbering less than an arbitrary limit, means for registering the location of the traffic in the vicinity of the current position of the aircraft, means for identifying thoroughfare sections used by the traffic, and means for displaying the traffic of the selected thoroughfare sections, wherein the means for registering the location of the traffic consider only:

the traffic in front of the aircraft, using the same thoroughfare section in the same direction or in the opposite direction, the traffic converging on the aircraft using the thoroughfare sections directly connected to that used by the aircraft, and parallel traffic in the same direction as the movement of the aircraft, over sections of optional thoroughfare, that can be used by the aircraft after travelling the thoroughfare section on which it stands.

10. The system according to claim 9, wherein the means for registering the location of the traffic also consider the traffic on the thoroughfare sections connected indirectly to that used by the aircraft, when they converge on the aircraft or move in the same direction as the aircraft while these thoroughfare sections are optional thoroughfare sections that can be used by the aircraft.

* * * * *